Oct. 11, 1938.   A. B. HURLEY   2,133,097
MOTION PICTURE SCREEN
Filed April 17, 1937
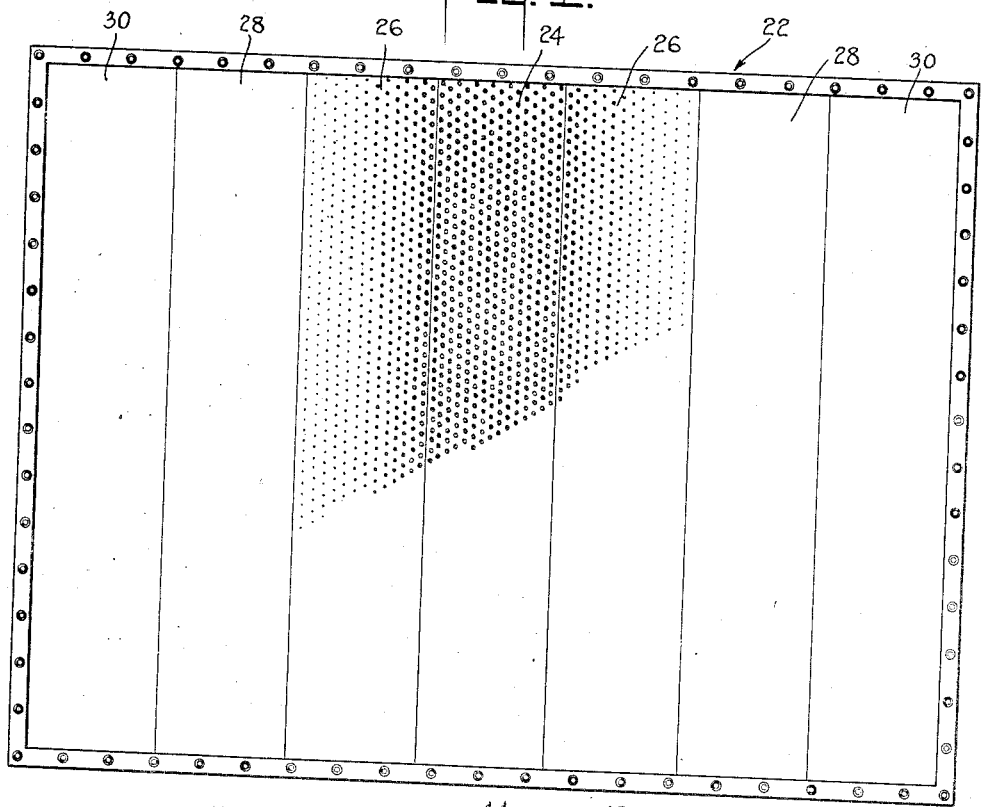
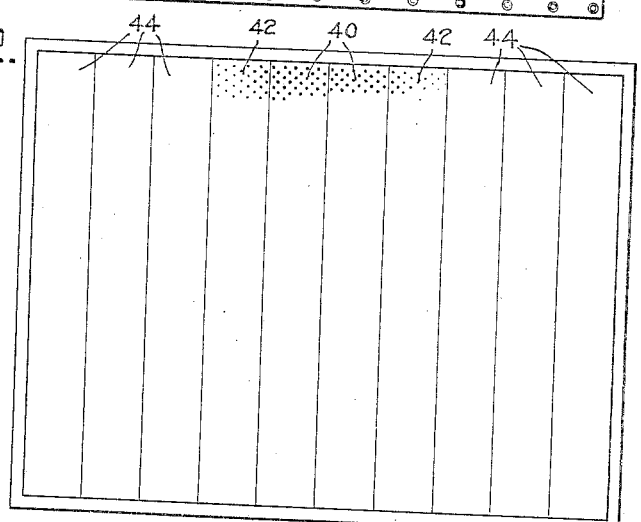
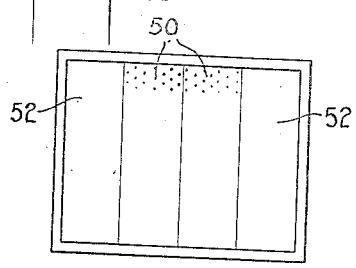
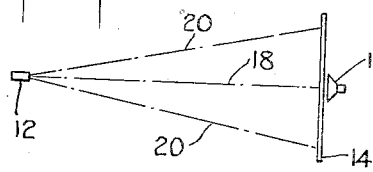
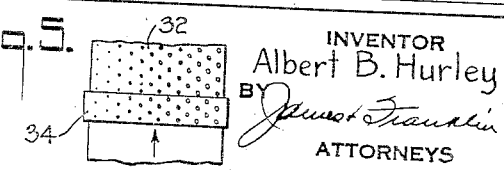
INVENTOR
Albert B. Hurley
BY
ATTORNEYS Patented Oct. 11, 1938

2,133,097

UNITED STATES PATENT OFFICE 2,133,097

MOTION PICTURE SCREEN

Albert B. Hurley, Huntington, N. Y.

Application April 17, 1937, Serial No. 137,421

11 Claims. (Cl. 88—24)

This invention relates to motion picture screens, and more particularly to a screen of the perforated type intended for use with sound motion pictures.

The primary object of the invention is to generally improve motion picture screens with associated speaker systems.

A more particular object is to compensate for the loss of light at the side portions of the screen. The reflection from the surface of a screen is a maximum at the center and is reduced toward the sides, for the projected light strikes the screen perpendicularly at the center but at an angle at the side portions. In a specific instance, measurement on a screen 25 feet wide showed a brightness in foot lamberts of 9.6 units at the center of the screen, 9.2 units at a point 4 feet from the center, 8.1 units at a point 8 feet from the center, and 6.2 units at a point 12 feet from the center. One of the objects of my invention is to compensate for and to at least partially counteract this unevenness in picture brightness, so that the illumination on the screen from side to side will be more nearly uniform.

The conventional motion picture screen for talking pictures is perforated with uniform perforations throughout its area, in order to improve the sound transmission therethrough. There is a direct conflict between the desire for good picture reproduction and good sound reproduction, for the sound transmission is improved by using an increased percentage perforation area, but the picture reproduction is spoiled by excessive perforation area. As a practical limit, I have found it desirable not to exceed 9% perforation area, preferably obtained by the use of 42 perforations to the square inch, each perforation being 50/1000 of an inch in diameter. The loud speakers have been disposed at various points in back of the screen, but the present-day tendency and the now conventional practice is to dispose the loud speakers at the center of the screen, the speakers being in vertical superposition when, as is commonly the case, a plurality of speakers are used.

In accordance with my invention, I employ maximum perforation at the center of the screen where the illumination is brightest and where the speakers are commonly located. I make the screen imperforate at the side portions thereof where the picture brightness is lowest. Between the center portion and side portions, I provide gradational perforations which decrease in diameter from the center toward the sides of the screen, or which increase in spacing, or, more preferably both. This provides a gradual transition over the surface of the screen from a perforated to an imperforate state, and the change is made sufficiently gradual to be entirely imperceptible to the audience. At the same time, because the light reflection is reduced at the center of the screen but not at the sides of the screen, the picture brightness is made relatively even and uniform.

The provision of gradational perforations constitutes a troublesome manufacturing proposition, and further objects of my invention center about the preferred method for making my improved screen.

To the accomplishment of the foregoing and such other objects as will hereinafter appear, my invention consists in the screen, projector, and speaker elements, and their relation one to the other as hereinafter are more particularly described in the specification and sought to be defined in the claims. The specification is accompanied by a drawing in which:

Fig. 1 is a front elevation of a screen of normal dimension embodying features of my invention;

Fig. 2 illustrates the screen arrangement employed for an extra-large screen or for a screen in which the loud speaker system is of great width;

Fig. 3 illustrates the mode of assembly of an unusually small screen;

Fig. 4 is a schematic plan view of a screen, projector, and speaker system, and is explanatory of the invention; and Fig. 5 is explanatory of the method of making the screen.

Referring to the drawing and more particularly to Fig. 4, the projector 12 illuminates a screen 14 behind which is located one or more speakers 16. The parts are shown in plan, and it will be observed that the center ray 18 strikes the screen at right-angles, while the outermost rays 20 strike the side portions of the screen at an angle. This and other factors having to do with the optical characteristics of the projector, result in decreased illumination at the sides of the screen, compared to that found at the center of the screen.

Referring now to Fig. 1 of the drawing, I provide a screen 22 which is perforated at the center portion 24 with a maximum percentage area of perforation. The intermediate screen portions 26 are gradationally perforated, so that the percentage area of perforation is gradually reduced from the center toward the sides of the screen. This may be done by decreasing the diameter of the perforations, or by increasing the spacing between the perforations, or, more preferably as here shown, by doing both. The amount of perforation thus gradually tapers off until the side portions 28 are reached, which portions are made imperforate.

For convenience in manufacture, I construct the screens by assembling together standardized bands or webs of material. These bands are of three types, one being uniformly perforated, as illustrated by the center band 24, another being gradationally perforated, as illustrated by the intermediate bands 26, and the third being imperforate, as illustrated by the solid bands 28. The particular screen here illustrated comprises additional solid or imperforate bands 30 disposed outside the bands 28. These bands or webs are conveniently made 50 inches in width and are conveniently secured together by stitching the same in approximately edge to edge relation, the webs being laid in face to face relation during the stitching operation, and the marginal portions of the webs being folded at the back of the screen. The effective width of each web is thus made approximately 4 feet.

The uniformly perforated web 24 may be made in accordance with conventional practice. The gradationally perforated webs 26 are made by feeding a web 32 step by step in a longitudinal direction, as shown in Fig. 5, across a perforating die 34 extending transversely of the web 32. The die 34 is provided with perforating pins which correspond to the desired gradational perforations, that is, the pins begin at one end of die 34, with a diameter and spacing equal to that of the uniformly perforated center web 24, and gradually diminish in diameter and increase in spacing until the opposite end of the die is reached. Die 34 may carry four rows of perforations which are relatively staggered, and the longitudinal step by step feed of web 32 between successive operations of the perforating die 34 is equivalent to four rows of perforations, thus producing a web which is continuously perforated in a longitudinal direction. Obviously the perforations are uniform in a longitudinal direction, or, in respect to the finished screen, the perforations are uniform in a vertical direction. In a specific case, the perforations of the center web are $50/1000$ths of an inch in diameter, and in the intermediate webs begin with a diameter of $50/1000$ths of an inch, then drop to $44/1000$ths of an inch, then to $38/1000$ths of an inch, and finally to $33/1000$ths of an inch. This is sufficiently small for ordinary practical purposes, but the holes may, of course, be reduced to still smaller size if desired. The spacing between holes is increased transversely of the web by $1\frac{1}{2}/1000$ths of an inch between successive holes. The change in diameter is by groups of holes, but the change in spacing is continuous for each successive hole. These dimensions are mentioned merely by way of illustration, and not in limitation of the invention.

The motion picture screen shown in Fig. 1 is approximately 28 feet in width, and it has a perforated area approximately 12 feet in width. The area of maximum perforation is approximately 4 feet in width, and the loud speakers are preferably disposed in superposed relation behind this centermost web.

In some cases it may be desired to increase the width of the uniformly perforated area, as when dealing with a very wide screen, or, more particularly, when using a loud speaker system the horn or baffling arrangement of which is such as to occupy a width substantially greater than 4 feet. In such case it is merely necessary to provide two of the uniformly perforated webs 24 at the center of the screen. Such a screen is illustrated in Fig. 2 in which the two center webs 40 are uniformly perforated with a maximum area of perforation; the next two webs are gradationally perforated; while the remaining webs 44 are imperforate.

On the other hand, when dealing with a small screen with a correspondingly small speaker system, it sometimes proves unnecessary or undesirable to employ the uniformly perforated web. Thus, referring to Fig. 3, I show a comparatively small screen which is made up of gradationally perforated webs 50 assembled, of course, with the maximum perforation sides adjacent one another and the minimum perforation sides remote from one another. The screen further comprises imperforate webs 52 located outside the gradationally perforated webs 50.

In this manner, screens of varying size and adapted to meet varied conditions may be assembled while using a few standardized webs. It will be understood, however, that this is done merely for manufacturing convenience and economy, and that theoretically the distribution and gradation of perforation may be varied differently for each installation, in an effort to most nearly compensate for the loss of illumination between the center and side portions of the screen in that particular installation.

It will be noted that no attempt is made for gradational perforation in a vertical direction. Such gradational perforation is unnecessary because in the ordinary installation the projection, when viewed in elevation, is at an angle to the entire screen, for the projection booth is commonly located above one or more balconies and above the screen. The difference in angularity and any consequent difference in illumination between the top and bottom of the screen is less noticeable, and the bottom of the screen is nearer the audience. Of course, manufacturing convenience also makes it important to use perforations which are uniform in one direction. Moreover, the projector is adjustable in a vertical direction, and the "hot spot" or point of highest intensity illumination may be moved up or down the screen—something which cannot be done with respect to the side to side illumination of the screen. It is interesting to note at this point that if such an adjustment were made from side to side, or, in other words, if a particular installation were encountered in which the screen were most brilliantly illuminated at one edge and least brilliantly at the opposite edge, the distribution of the perforations could be varied to provide a maximum area of perforation at one side, and an absence of perforation at the opposite side. In such case the perforations would be graded or tapered from one side toward the other, instead of from the center toward both sides.

I have heretofore mentioned that the speakers are preferably located at the center of the screen behind the area of maximum perforation. It may be pointed out, however, that the efficient transmission of low frequency tones does not require as much perforation as high frequency tones. In fact, low frequency tones may be efficiently transmitted through even an imperforate screen. It is therefore entirely possible to employ the present invention while disposing a high frequency speaker behind the uniformly perforated web, and one or more low frequency speakers behind the imperforate webs, should such an arrangement prove more convenient in any particular installation.

The screen may be seamless instead of seamed. This complicates the apparatus for perforating the screen, and I therefore prefer the seamed construction for machine perforation. However, it is also possible to perforate the screen "by hand", that is, by using a small block die which is moved manually relative to the much larger seamless screen. In such case the gradation from side to side may be varied as desired, and moreover, gradation in a vertical direction may be obtained, along with gradation in a horizontal direction. Thus, if the "hot spot" is located one-third of the way from top to bottom, the maximum perforation may be located at that point, and the per cent perforation may taper off above and below the "hot spot", as well as from the middle sidewardly.

It is believed that the construction, installation, operation, as well as the many advantages of my improved motion picture screen and associated apparatus, will be apparent from the foregoing detailed description. It will also be apparent that while I have shown and described my invention in preferred forms, many changes and modifications may be made without departing from the spirit of the invention, defined in the following claims.

I claim:

1. A motion picture projector screen and speaker system, comprising a surface made of light-reflecting material, for use with a projector so illuminating the same that one part is more intensely lighted than another part, the intensely lighted portion of said screen being perforated with a maximum percentage area of perforations in order to efficiently transmit sound therethrough, the percentage area of the perforations being reduced progressively from the said part toward the less intensely lighted part of the screen, the least intensely lighted part of the screen being imperforate, the change in perforation from one part toward the other part of the screen being gradual and imperceptible to the audience, and a loud speaker disposed behind the region of maximum percentage perforation area.

2. A motion picture screen comprising a surface made of light-reflecting material, the center portion of said screen being perforated with a maximum percentage area of perforations in order to efficiently transmit sound therethrough, the percentage area of the perforations being reduced gradually and progressively from the center portion toward the outer portions of the screen.

3. A motion picture screen comprising a surface made of light-reflecting material, the center portion of said screen being perforated with a maximum percentage area of perforations in order to efficiently transmit sound therethrough, the diameter of the perforations being reduced and the spacing between perforations being increased progressively from the center portion toward the outer portions of the screen, the outer portions of the screen being imperforate, and the change in perforation from the center portion toward the outer portions of the screen being gradual and imperceptible to the motion picture audience.

4. A motion picture screen comprising a surface made of light-reflecting material, the center portion of said screen being perforated with a maximum percentage area of perforations in order to efficiently transmit sound, the percentage area of the perforations being reduced progressively from the center portion toward the outer portions of the screen, the outer portions of the screen being imperforate, and the change in percentage area of perforation from the center portion toward the outer portions of the screen being such as to help compensate for the usual reduction in picture brightness at the outer portions of the screen compared to the center portion of the screen.

5. A motion picture screen and speaker system comprising a surface made of light-reflecting material, the center portion of said screen being perforated with a maximum percentage area of perforations in order to efficiently transmit sound therethrough from speakers disposed in back of the screen, the diameter of the perforations being reduced and the spacing between perforations being increased progressively from the center portion toward the outer portions of the screen, the outer portions of the screen being imperforate, the change in perforation from the center portion toward the outer portions of the screen being gradual, and loud speakers disposed behind the center portion of the screen at the region of maximum percentage perforation area.

6. A motion picture screen made of a plurality of vertically disposed bands or webs of fabric secured together in edge to edge relation, the center portion of said screen being perforated with a maximum percentage area of perforations in order to efficiently transmit sound therethrough, the percentage area of the perforations being reduced progressively in a horizontal direction from the center portion toward the side portions of the screen, the perforation diameter and spacing being uniform in a vertical direction.

7. A motion picture screen made of a plurality of vertically disposed bands or webs of fabric secured together in edge to edge relation, the center portion of said screen being perforated with a maximum percentage area of perforations in order to efficiently transmit sound therethrough, the diameter of the perforations being reduced and the spacing between perforations being increased progressively in a horizontal direction from the center portion toward the side portions of the screen, the perforation diameter and spacing being uniform in a vertical direction, the side webs of the screen being imperforate, and the change in perforation from the center toward the side webs of the screen being gradual and imperceptible to the audience.

8. A motion picture screen comprising an odd number of vertically disposed bands or webs of fabric secured together in edge to edge relation, the center web being provided with a maximum percentage area of perforation, and said perforations being uniform, the webs at each side of the center web being perforated with gradational perforations having a diameter and spacing equal to that of the center web at the edge adjacent the center web but decreasing in diameter and increasing in spacing toward the edge remote from the center web, said perforations being uniform in a vertical direction or longitudinally of the web, the webs outside the gradationally perforated webs being imperforate.

9. A motion picture screen comprising vertically disposed bands or webs of fabric secured together in edge to edge relation, a plurality of webs at the center being provided with a maximum percentage area of perforation, and said perforations being uniform, the web at each side of the center webs being perforated with gradational perforations having a diameter and spacing equal to that of the center webs at the edge adjacent the center webs but decreasing in diameter and increasing in spacing toward the edge remote from the center webs, said perforations being uniform in a vertical direction or longitudinally of the web, the webs outside the gradationally perforated webs being imperforate.

10. A motion picture screen comprising an even number of vertically disposed bands or webs of fabric secured together in edge to edge relation, the centermost webs being perforated with gradational perforations having a maximum diameter and minimum spacing at their adjacent edges, and said perforations decreasing in diameter or/and increasing in spacing in a horizontal direction or transversely of the webs toward their remote edges, said perforations being uniform in a vertical direction or longitudinally of the webs, the webs outside the gradationally perforated webs being imperforate.

11. The method of making a gradationally perforated motion picture screen, which includes uniformly perforating a web of light reflecting material by uniformly spaced lines of uniform perforations extending transversely of the web, gradationally perforating a web of light reflecting material by uniformly spaced lines of non-uniform perforations extending transversely of the web, said perforations decreasing in diameter and increasing in spacing along each line, that is, transversely of the web, and assembling the uniformly perforated, the gradationally perforated, and some imperforate webs of light reflecting material in edge to edge relation with the webs extending in a vertical direction to form a complete motion picture screen, the gradationally perforated webs being disposed outside the uniformly perforated webs, with the large perforations toward the center of the screen and the small perforations toward the outside of the screen, and the imperforate webs being disposed outside the gradationally perforated webs.

ALBERT B. HURLEY.